United States Patent [19]

Meyer

[11] 4,199,234

[45] Apr. 22, 1980

[54] SLIDE PROJECTOR APPARATUS

[76] Inventor: Bruno Meyer, Lindenstr. 2, 5238 Hachenburg, Fed. Rep. of Germany

[21] Appl. No.: 20,955

[22] Filed: Mar. 13, 1979

[30] Foreign Application Priority Data

Mar. 13, 1978 [DE] Fed. Rep. of Germany ....... 2810883

[51] Int. Cl.$^2$ .......................... G03B 23/04; B65H 3/32
[52] U.S. Cl. ...................................... 353/116; 353/118
[58] Field of Search .................. 353/27 A, 116, 118, 353/114

[56] References Cited

U.S. PATENT DOCUMENTS

| | | | |
|---|---|---|---|
| 3,528,735 | 9/1970 | Bluitt et al. | 353/27 A |
| 4,053,215 | 10/1977 | Haning et al. | 353/118 |

FOREIGN PATENT DOCUMENTS

2123866  9/1972  France.

Primary Examiner—Steven L. Stephan
Attorney, Agent, or Firm—Cushman, Darby & Cushman

[57] ABSTRACT

A slide projector is juxtaposed with a slide magazine in a housing. One of the projector and magazine is movably mounted so that each slide may be aligned with where it may be loaded into the projector and unloaded back into the magazine. At the loading station a pair of pivotable, opposed toggles operated by an eccentric device frictionally rollingly grip and release two opposite edges of the slide with reversibly driven rollers. In a disclosed elaboration, a plurality of slide magazines are disposed on a spider, which may be rotated to bring any selected magazine into juxtaposition with the projector. In the elaborated version shown, the slide projector is laterally movably mounted for temporary retraction during indexing of the spider.

17 Claims, 10 Drawing Figures

SLIDE PROJECTOR APPARATUS

BACKGROUND OF THE INVENTION

It is known to mount a magazine, e.g. a tray for individual diapositive plates, e.g. mounted slide transparencies in relatively axially movable lateral juxtaposition with the beam of projected light rays of a slide projector, and to successively temporarily laterally displace individual slides one at a time from their relative open-sided cells in the slide tray into the path of the light beam for successive projection of the respective slides upon a screen by using a slide changer. In some devices of this type, e.g. for use as informative or promotional kiosks, the projector, changer, and magazine are all housed in a common housing which further includes a rear projection screen in the front wall thereof. In other devices of this type, instead of a selfcontained screen, a separate front-projection screen is used.

The present invention is directed toward providing slide projector devices of the above types with an improved changer and means for juxtaposing.

SUMMARY OF THE INVENTION

A slide projector is juxtaposed with a slide magazine in a housing. One of the projector and magazine is movably mounted so that each slide may be aligned with where it may be loaded into the projector and unloaded back into the magazine. At the loading station a pair of pivotable, opposed toggles operated by an eccentric device frictionally rollingly grip and release two opposite edges of the slide with reversibly driven rollers. In a disclosed elaboration, a plurality of slide magazines are disposed on a spider, which may be rotated to bring any selected magazine into juxtaposition with the projector. In the elaborated version shown, the slide projector is laterally movably mounted for temporary retraction during indexing of the spider.

The invention relates to a projector for slides which makes use of a plurality of slides arranged in a stack-like series. The series is movable longitudinally relative to the projector and the individual slides are laterally movable in a plane when disposed at a projection station of the projector. The slides are received in the cells of a magazine. Either the magazine is shiftable relative to the projector or the projector is shiftable relative to the magazine in order to bring successively desired slides into the plane of the projection station. At the projection station a changing device is provided for laterally shifting the slide which is at the projection station into the path of the light beam of the projector.

It is an object of the invention to further develop such a projector with a view toward improving the reliability and mode of operation thereof as well as to improve the space requirement for such a projector relative to the capacity thereof.

Accordingly, the present invention provides a changing device which includes two toggle levers which are in contact at one site thereon with an eccentric disk and which are in contact at a laterally displaced site thereof with respective motor-driven friction wheels, or the like. Respective pivotal mountings for the toggle levers between these two sites on each provide for rotation of the toggle levers to bring the rotating friction wheels into and out of opposed driving relationship with the opposite edges of such slide as is located at the projection station. The friction wheels may be reversibly driven so that they may retrieve from the projector the slide which has been fed thereinto for projection and return the retrieved slide to the magazine.

The projector device as shown includes a sensor for informing an electronic control for the eccentric disk driving motor exactly when the magazine has been shifted longitudinally relative to the projector just enough to bring the slide which has been selected for projection so that it lies in the plane of the projecting station, ready for displacement into the path of the beam of projected light rays.

The changer of the projector of the present invention is distinguished by being reliable and compact.

The rotary axes of the friction wheels which drivingly engage the opposite edges of the slide in the projecting station are parallel to one another and perpendicular to the plain of the projecting station.

By preference, the drive motors for the friction wheels are mounted directly on the toggle levers. As a result, the additional weight increases the contact pressure with which the friction wheels are pressed against the opposed slide edges. A gear train may be provided between the respective friction wheels and drive motors.

Also by preference, where the toggle levers engage the eccentric disk which causes pivoting of the toggle levers, the toggle levers are provided with rollers. In a further elaboration of the invention, the slide magazine is vertically adjustable by means of a spindle which is rotated by an electric motor. This spindle carries a radially slided disk. Except for where the slot is located, the disk acts as a light barrier between the transmitter and receiver of an electric eye means which is coupled to a control for the electric motor.

In a further elaboration the capacity of the projector is increased by disposing several magazines, each with its own mechanical changer, about the axle of a rotary frame. A mechanical drive, typically including gear, chain, belt and/or friction wheel drive means or the like is provided for rotating the axle to bring the desired magazine into juxtaposition with the projector. Alternatively, a single changer may be mounted on the projector. Where necessary the projector is movably mounted relative to the housing so that it may temporarily withdraw away from the array of magazines when the frame upon which the magazines are mounted is to be rotated in order to bring another magazine into juxtaposition with the projector.

The principles of the invention will be further discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS

In the Drawings

FIG. 4a is a fragmentary rear elevation view, on a larger scale, of the upper right corner region of FIG. 2, with added schematic details;

FIG. 4b is a plan view of the slotted disk of FIG. 4a;

DETAILED DESCRIPTION OF THE PRESENTLY PREFERRED EMBODIMENTS

Figure 1:
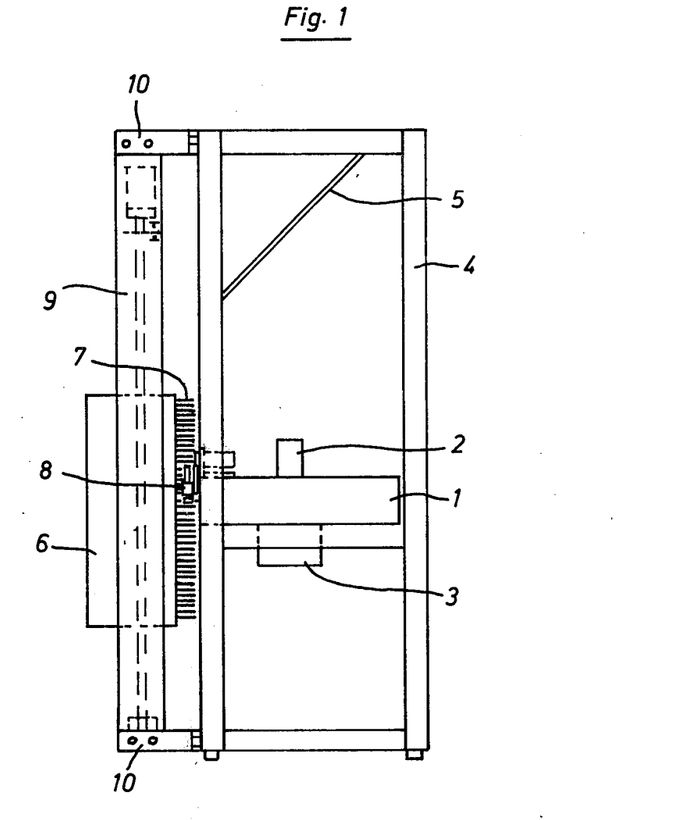
FIG. 1 is a side elevation view of a slide projection device according to the principles of the present invention.

According to FIG. 1, a projector 1, with a lens 2 and a housing 3 for the accommodation of a lamp, of lenses and ventilator is disposed in a projection housing 4, whereby the lens 2 is directed against a reflecting mirror 5, attached in the upper part of the projection housing 4. The reflecting mirror 5 may throw the pictures emanating from the projector 1 onto a rear projection screen not illustrated, which fronts the projection housing 4, or else in case there is no self-contained screen, throw the pictures onto a separate screen outside the projection housing for a considerably enlarged rendition.

A mechanical changer is assigned to the projector 1. It uses a vertically adjustable magazine 6 for the horizontal reception of a plurality of individual slides 7 and a changing device 8 for insertion of the individual slides 7 into the projector 1, as well as removal thereof therefrom. The magazine 6 is disposed in a frame 9 which is articulated by means of hinges to the projection housing 4 and may be swivelled out together with the magazine 6.

Figure 2:
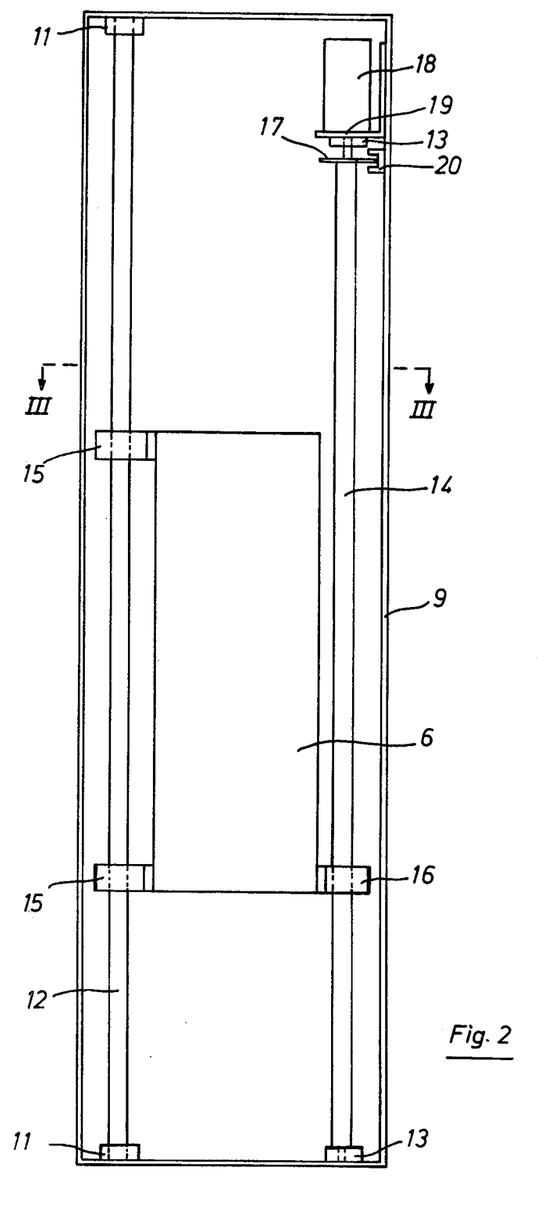
FIG. 2 is a rear elevation view thereof.
Figure 3:
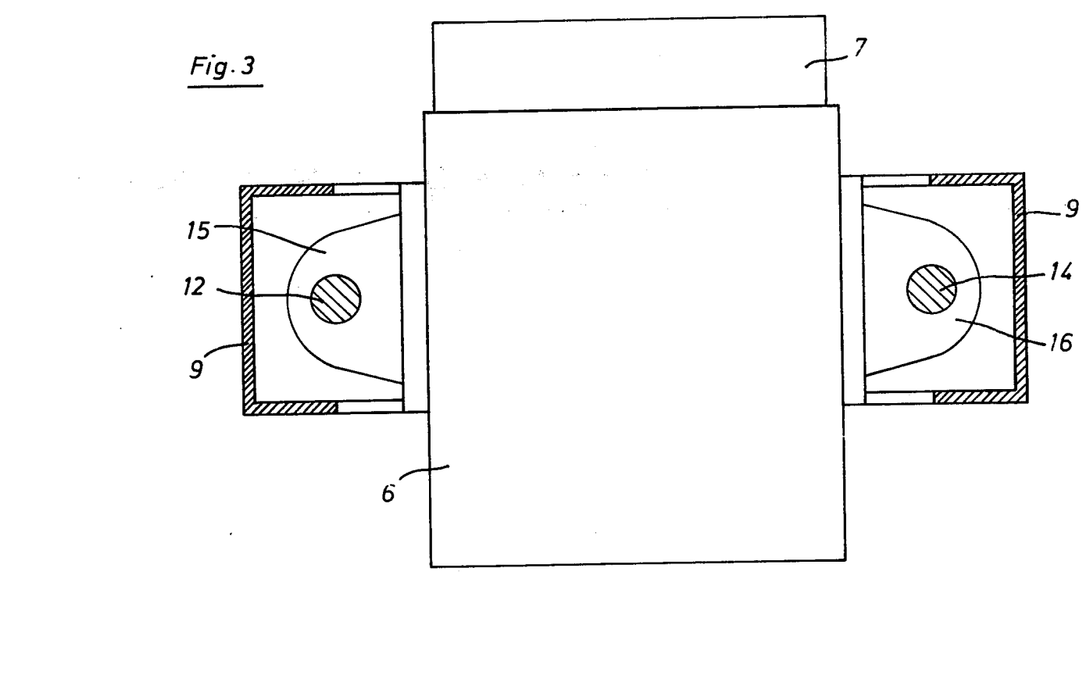
FIG. 3 is a horizontal sectional view looking downwards along the plane III—III of FIG. 2.

According to FIGS. 2 and 3, a shaft 12 serving for guidance, is disposed within the frame 9 between bearing blocks 11, and a, e.g. externally threaded spindle 14 serving as a drive, is disposed between bearings 13, whereby the magazine 6 is engaged by way of guide elements 15 within the shaft 12, and by way of an internally threaded drive nut 16, with the spindle 14.

The upper end of the spindle 14 carries a disk 17, and is connected with an electric motor 18. The electric motor 18 is attached to frame 9 by means of a bracket 19. Moreover, a sensing device 20 is fixed on the frame 9, and to be sure in such a way that the disk 17 may rotate in its range for control of the electric motor 18, i.e. for the change of the relative vertical disposition of the magazine 6.

Figures 4A, 4B:
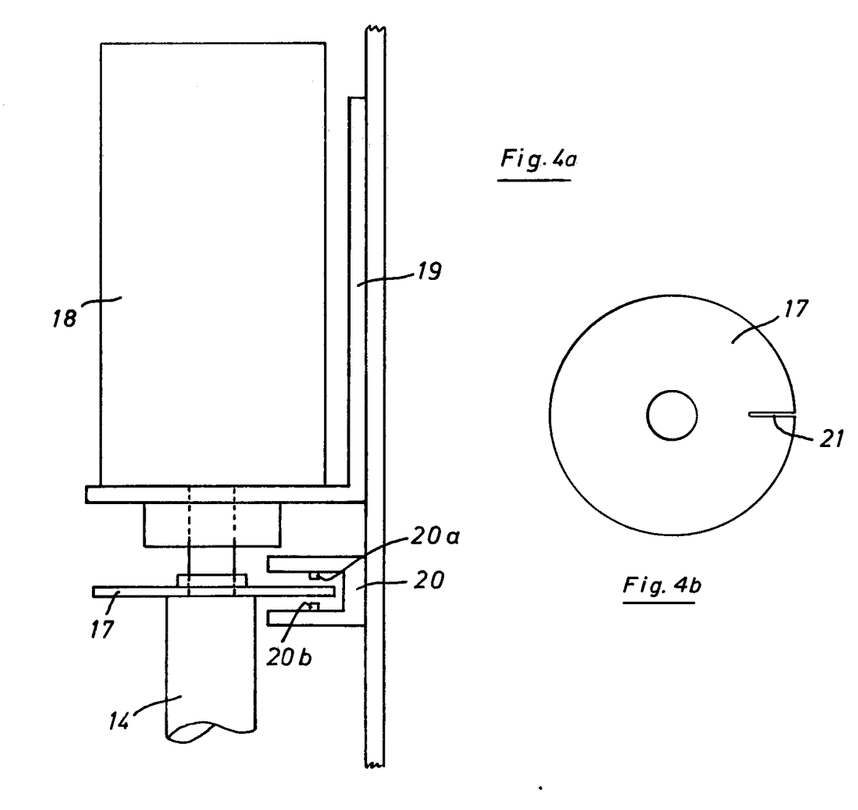

As FIG. 4 shows in more detail, the sensing device 20 is equipped with a light transmitter 20a and a light receiver 20b, and the disk 17 has a radial slot 17a, which upon rotation of the disk 17 with the spindle 14 periodically permits the passage of a light ray from 20a to 20b which leads to raising or lowering of the magazine 6 by one slide position with each one or more integral rotations of the spindle 14. The desired plate position is selected by means of an otherwise conventional electronic control device, e.g. provided with a conventional selector.

Figure 5:
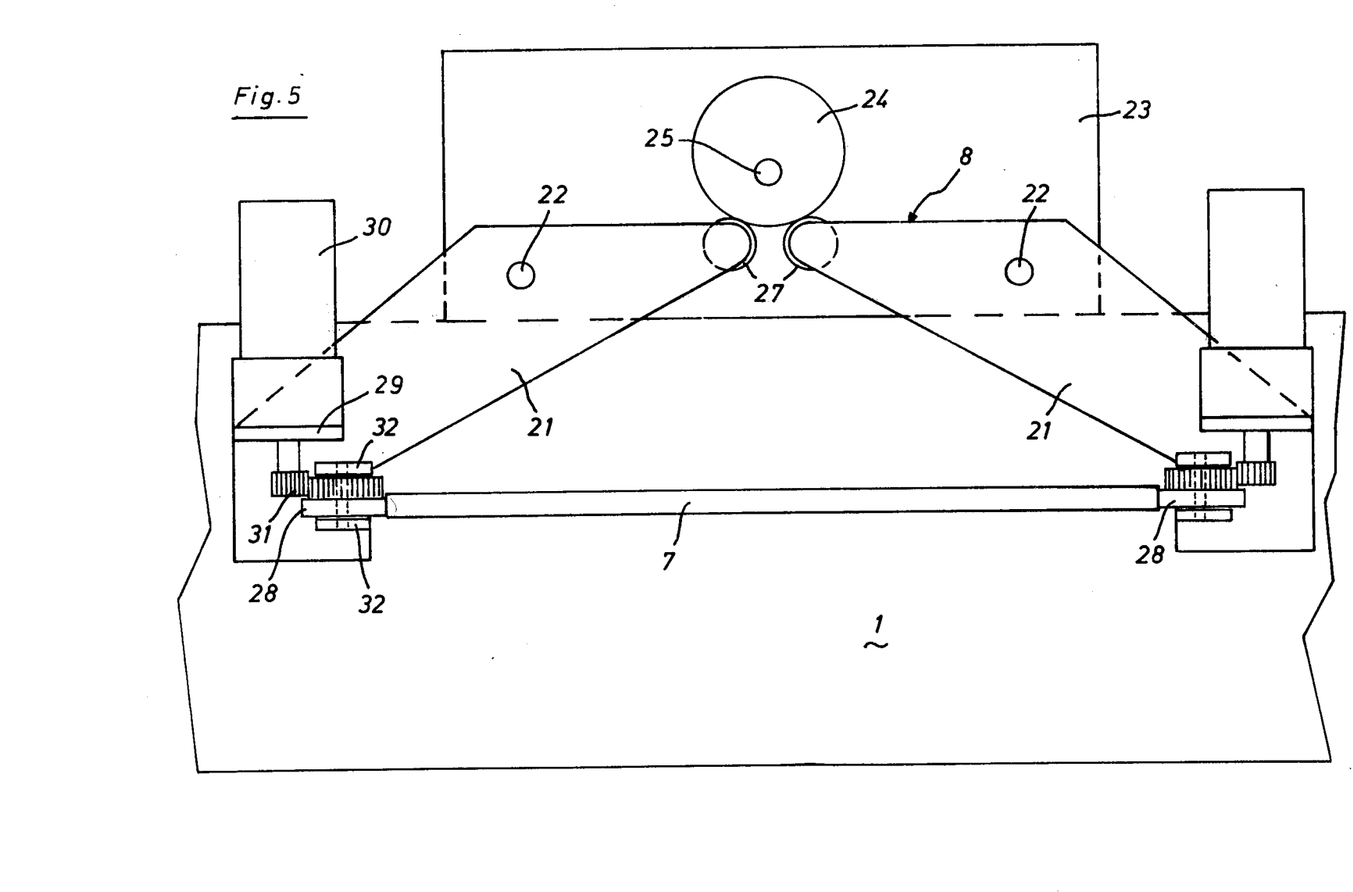
FIG. 5 is an enlarged scale front elevation view of the changer, i.e. looking leftwards from the projector toward a slide in the projecting station, the magazine and other slides being omitted from this view for the sake of clarity.
Figure 6:
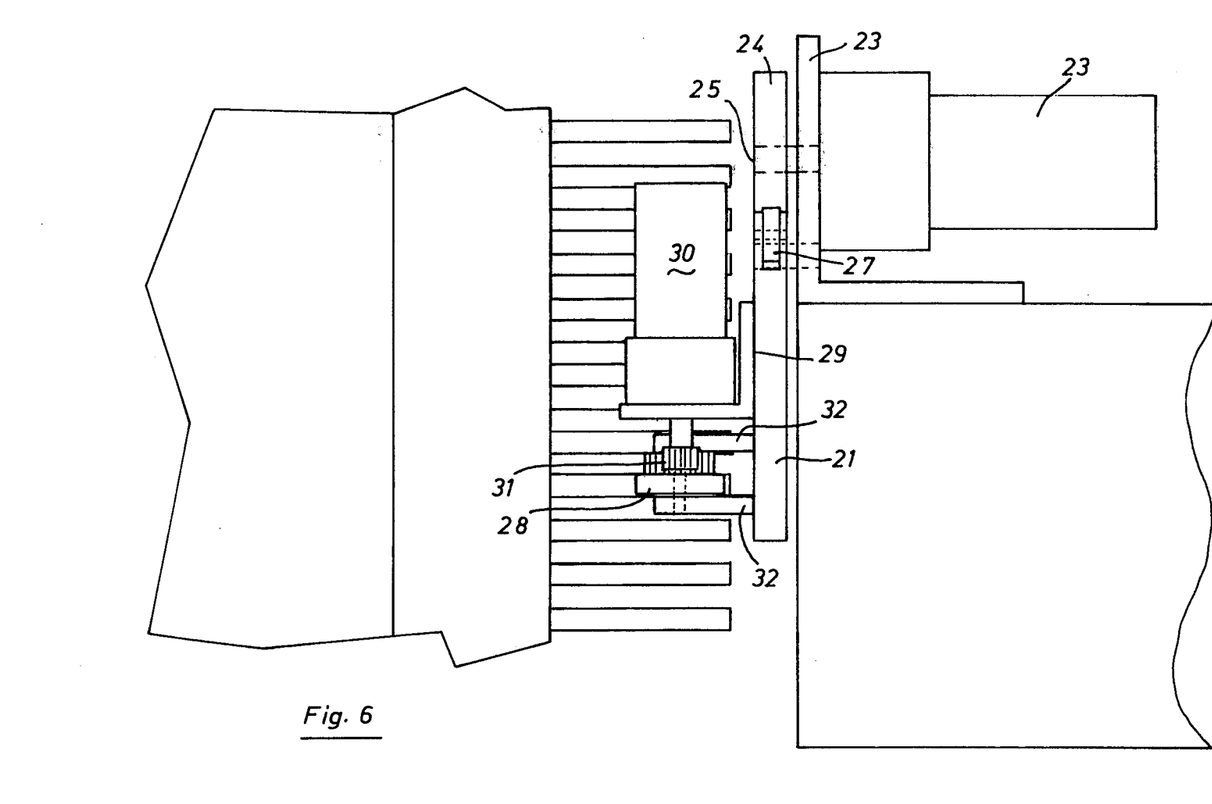
FIG. 6 is a fragmentary side elevation view of the magazine, changer and projector, on the same scale as FIG. 5.
Figure 7:
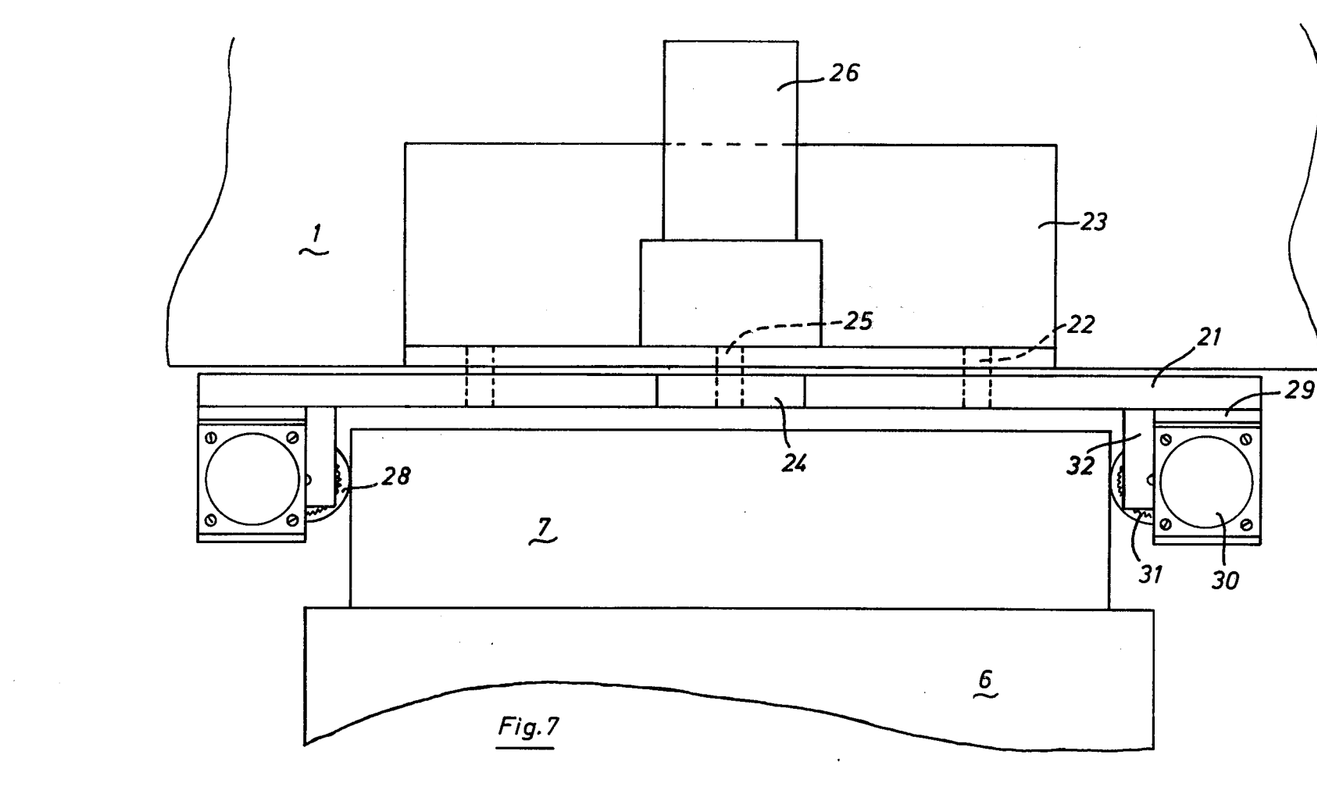
FIG. 7 is a top plan view thereof.

According to FIGS. 5, 6 and 7 the changing device for the slides 7 includes two toggle levers 21, which are disposed on a support 23 by means of journals 22. The support 23 is connected with the projector 1. In addition, an eccentric disk 24 is disposed on the support 23, which may be rotatably driven, i.e. adjusted in angular disposition via a driving axle 25 and a motor 26.

The eccentric disk 24 is always in contact with one end of the toggle levers 21 and is capable of swivelling them about the journals 22 upon rotation. In order to reduce friction between the eccentric disk 24 and the one ends of the toggle levers 21, the latter are shown provided with respective rollers 27.

At their respective other ends, the toggle levers 21 have friction wheels 28 rotatably mounted thereon which may be made to engage from the outside with the opposite edges of the slide 7 which is then in the plane of the projecting station being parallel to drawing in direction. Driving the friction wheels 28 is accomplished via electric motors 30 and respective gear transmission 31 attached by means of respective brackets 29 directly on the toggle levers 21.

Whenever the friction wheels 28 engage against the opposite edges of the slide 7, as shown, their rotary axes are generally perpendicular to the drawing, i.e. to the plane of the slide 7. The friction wheels 28, at the same time, are held between bearing elements 32. The contact pressure of the friction wheels 28 against the slide 7 may, if need be, bolstered by attachment of so-called leg springs (as in case of a clothes pin) near the journals 22 or by use of similar aids.

The changing device 8, shown, operates as follows. First, the desired slide is selected by using the selector of the electronic control. Then, the conveying apparatus inside the projector 1 relatively moves into receiving position, relative to the selected slide 7, located in the magazine 6 and protrudes therefrom toward the projector 1 so far that its edges may be seized by the friction wheels 28 of the changing device. Whenever this position has been reached, the motor 26 turns the eccentric disk 24 and thus swivels the toggle levers 21, until the friction wheels 28 fit against the opposite edges of the slide 7 and are able to withdraw that slide from the magazine 6 and insert it into the projector 1. For unloading the projector the toggle levers are swivelled again with the friction wheels being rotated to withdraw the slide from the projector and load it back into the respective cell of the magazine.

Subsequently upon choice of another slide for viewing, the toggle levers 21 again swivel away and the magazine 6 moves into the desired position. Now the toggle levers 21 again swivel past and the friction wheels 28, in case of a reverse rotary direction, pull the newly selected slide 7 into the projector 1.

Figure 8:
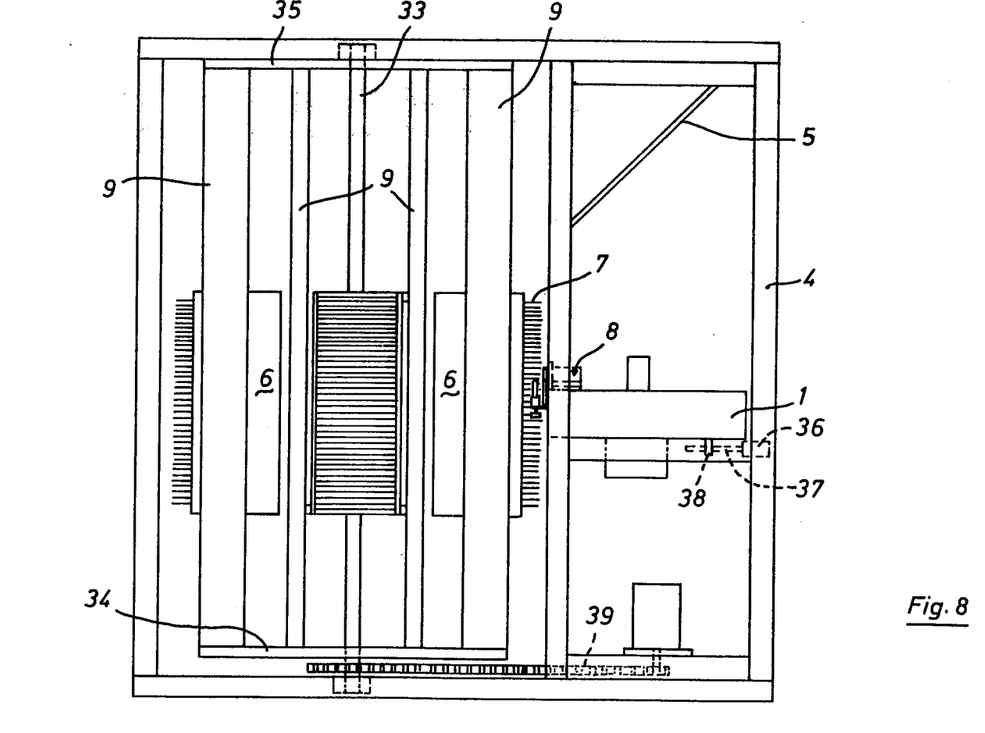
FIG. 8 is a side elevation view, similar to FIG. 1, but of a variation wherein several magazines are mounted about the periphery of a rotatable spider.
Figure 9:
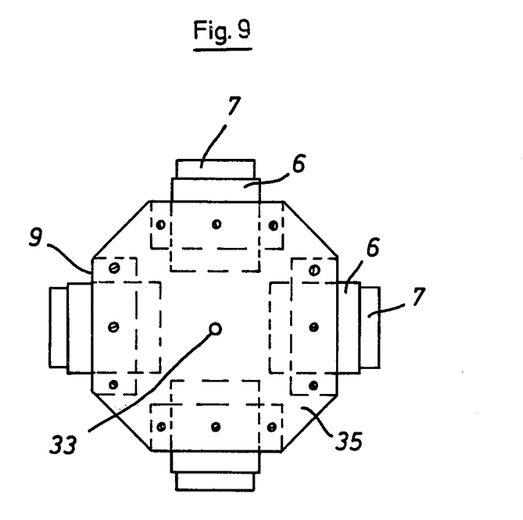
FIG. 9 is a top plan view of the plurality of magazines and spider of FIG. 8.

According to the elaboration shown in FIGS. 8 and 9, the mechanical changer comprises several independently vertically adjustable magazines 6, disposed symmetrically to a vertical axle 33 and rotatable around it. On a spider comprising their respective frames 9 the magazines 6, together with their frames 9 are connected by way of a common base plate 34 as well as a cover plate 35. The changing device 8 is disposed on the projector 1 and the projector 1 is laterally movable in the projection housing 4 in the drawing in direction of the slides 7, in order to remove the changing device 8 from the range of rotation of the magazines 6 and to make possible the bringing into lateral juxtaposition with the projector of another one of the magazines 6. A motor 36 with a spindle 37 and a drive nut 38 have been shown in FIG. 8 provided for laterally moving the projector 1.

The rotation of the whole array of magazines 6 may be accomplished with the help of a chain drive 39 on the under side of the base plate 34. Any other conventional driving elements such as gear transmission, belt or friction wheel drive could be used here just as well. Also, the number of magazines 6 arranged in the manner just described need not be 4, but could be 2, 3 or several.

Instead of a single changing device 8 for several magazines 6, several complete mechanical changers, i.e. several magazines 6, each coupled with its own changing device 8 may be disposed and driven in an analogous manner. Although that requires several changing devices 8, it permits use of a fixed arrangement of the projector 1 in the projection housing 4, and thus a corresponding simplification including omission of the lateral moving means 36, 37, 38.

It should now be apparent that the slide projector apparatus as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. In a slide projecting apparatus which includes:
   a projector for projecting a light beam along a path and having a slide projecting station located in a plane which crosses said path;
   at least one magazine with a succession of laterally open cells, each for slidably removable receipt of a respective slide the magazine having a disposition wherein said magazine extends along said path but being laterally displaced therefrom;
   means for axially moving said succession of cells relative to said projecting station so as to make it possible to bring each cell into said plane of said projecting station; and
   changing means associated with one of said projector and magazine for laterally displacing such slide as is in such said cell as is then in said plane of said projecting station, along said plane into said path for projection of said beam therethrough, and for laterally displacingly returning such slide as is in said path laterally along said plane into a respective said cell,
   the improvement wherein:
   said changing means comprises:
   two toggle levers each having first and second opposite end portions and means journalling each toggle lever for swivelling about an axis between said first and second end portions thereof;
   drivable eccentric means in operative contact with the respective first end portions of the two toggle levers, mounted for movement between a first condition wherein the second end portions of two toggle levers are located relatively nearer to one another and a second condition wherein the second end portions of the two toggle levers are located relatively further apart;
   the said second end portions each including a driven tractive surface element means in said plane and means for reversibly driving said tractive surface element in said plane;
   said tractive surface element means being disposed to frictionally engage opposite edges of such slide as is located in said plane, whether in said magazine or in said projector or in transit therebetween, only when said toggle levers are in said first condition, for transferring selected slides back and forth between said magazine and said projector.

2. The slide projecting apparatus improvement of claim 1, wherein:
   each tractive surface element means comprises a friction wheel having an axle which, at least when said second end portions are in said first condition thereof extend perpendicularly to said plane.

3. The slide projecting apparatus improvement of claim 2, wherein:
   said means for reversibly driving said tractive surface element means are respective motors.

4. The slide projecting apparatus improvement of claim 3, wherein:
   each motor is mounted direclty on the respective toggle lever.

5. The slide projecting apparatus improvement of claim 4, wherein:
   each motor has a respective output shaft and there is provided a transmission means between each respective output shaft and axle.

6. The slide projecting apparatus improvement of claim 1, wherein:
   said drivable eccentric means is constituted by an eccentric disk and motor means for rotating said disk in contact with said first end portions of both said toggle lever means.

7. The slide projecting apparatus improvement of claim 6, wherein:
   each toggle lever first end portion includes a roller and said first end portions are in contact with said eccentric disk via said rollers.

8. The slide projecting apparatus improvement means of claim 1, wherein the means for axially moving said succession of cells relative to said projecting station comprises:
   a threaded spindle mounted for rotation;
   means for rotating said spindle;
   a drive nut threaded on said spindle and mounted to said magazine.

9. The slide projecting apparatus improvement of claim 8, wherein:
   the means for axially moving further includes a disk mounted on said spindle for rotation therewith;
   means providing an eccentric opening through said disk;
   a signal sending device and a signal receiving device disposed on opposite sides of said disk, so that a signal may reach said signal receiving device from said signal sending device only when said disk has rotated sufficiently to align said eccentric opening between said signal sending and receiving devices;
   the signal receiving device being operatively connected with said means for rotating said spindle for terminating rotation of said spindle in relation to whether a signal is received by said signal receiving device.

10. The slide projecting apparatus improvement of claim 9, wherein:
    the signal sending device is an electric light.

11. The slide projecting apparatus improvement of claim 8, wherein:
    said means for rotating the spindle is a motor having an output shaft operatively coupled to said spindle.

12. The slide projecting apparatus improvement of claim 1, wherein:
    said at least one magazine is constituted by a plurality of individual magazines mounted on a frame, and means for moving said frame in order to bring each such magazine into said disposition.

13. The slide projecting apparatus improvement of claim 12, wherein:
   said frame is a rotary spider, said individual magazines are spaced angularly about, and said means for moving said frame is constituted by means for rotating said frame.

14. The slide projecting apparatus improvement of claim 13, wherein:
   said changing means is singularly provided and is associated with said projector.

15. The slide projecting apparatus improvement of claim 14, further including:
   a housing for said projector, said magazines, said means for axially moving said succession of cells and said changing means; and
   said housing including means for temporarily laterally moving said projector laterally away from said magazine disposition to permit rotary indexing of said frame.

16. The slide projecting apparatus improvement of claim 15, wherein:
   said means for temporarily laterally moving said projector comprises means movably mounting the projector in said housing, and a motor-driven spindle having a drive nut threaded thereon, said motor and drive nut being operatively interposed between the projector and the housing.

17. The slide projecting apparatus improvement of claim 13, wherein:
   said changing means is replicated in corresponding plurality to said plurality of magazines and each such changing means is associated with a respective one of said magazines.

* * * * *